United States Patent [19]

Yoshinaga

[11] Patent Number: 5,241,059
[45] Date of Patent: Aug. 31, 1993

[54] CYCLODEXTRIN DERIVATIVES

[75] Inventor: Masanobu Yoshinaga, Tokyo, Japan

[73] Assignee: Toppan Printing Co., Ltd., Tokyo, Japan

[21] Appl. No.: 776,296

[22] PCT Filed: May 20, 1991

[86] PCT No.: PCT/JP91/00666

§ 371 Date: Dec. 6, 1991

§ 102(e) Date: Dec. 6, 1991

[87] PCT Pub. No.: WO91/18022

PCT Pub. Date: Nov. 28, 1991

[30] Foreign Application Priority Data

May 21, 1990 [JP] Japan ................................. 2-130511
Jul. 24, 1990 [JP] Japan ................................. 2-195467
Jul. 24, 1990 [JP] Japan ................................. 2-195468

[51] Int. Cl.$^5$ ............................................ C08B 37/16
[52] U.S. Cl. .................................... 536/4.1; 536/46; 536/103; 127/32
[58] Field of Search ............. 536/103, 4.1, 46, 122; 127/32; 527/300, 310, 311, 312

[56] References Cited

U.S. PATENT DOCUMENTS

| | | | |
|---|---|---|---|
| 3,453,257 | 7/1969 | Parmerter et al. | 536/46 |
| 3,453,260 | 7/1969 | Parmerter et al. | 524/29 |
| 4,020,160 | 4/1977 | Bernstein et al. | 536/103 |
| 4,535,152 | 8/1985 | Szejtli et al. | 536/103 |
| 4,582,900 | 4/1986 | Brandt et al. | 536/106 |
| 4,764,604 | 8/1988 | Müller | 536/106 |
| 4,870,060 | 9/1989 | Müller | 514/58 |
| 5,068,226 | 11/1991 | Weinshenker et al. | 536/103 |

FOREIGN PATENT DOCUMENTS 50-36422 4/1975 Japan.

OTHER PUBLICATIONS

Abstract of JP-A 1-131202, May 24, 1989; Kanehito Kamikama, "Novel Enteric Molecule Capsule".
Abstract of JP-A 63-122701, May 26, 1988; Kuniaki Tokuda, "Novel Cyclodextrin Derivative and Production Thereof".
Abstract of JP-A 58-210901, Dec. 8, 1983; Rikio Tsushima, "Cyclodextrin Derivative and its Preparation".

*Primary Examiner*—Nathan M. Nutter
*Attorney, Agent, or Firm*—Armstrong, Westerman, Hattori, McLeland & Naughton

[57] ABSTRACT

Cyclodextrin derivatives having at least one group selected from among a sulfonic acid group, a sulfonic acid salt group, an ammonium salt group, a phosphoric acid group, a carboxyl group, a carboxylic acid salt group and a hydroxyl group are disclosed. The present invention provides cyclodextrin derivatives having extremely high solubility in water.

17 Claims, No Drawings

CYCLODEXTRIN DERIVATIVES

TECHNICAL FIELD

This invention relates to cyclodextrin derivatives, more particularly to cyclodextrin derivatives having extremely high water solubility.

BACKGROUND ART

Chemicals such as pharmaceuticals and agrichemicals are generally required to have water solubility because of the nature of their use. One of the means of improving the water solubility of those chemicals that have been proposed in recent years is by including them in cyclodextrin.

However, because of the limited solubility of cyclodextrin in water, the cyclodextrin inclusion compounds have had the problem that their water solubility is still insufficient for practical applications. Under these circumstances, efforts have been made to improve the solubility of cyclodextrin in water by various methods such as methylating, hydroxyethylating or hydroxypropylating cyclodextrin, or synthesizing polymers crosslinked with epichlorohydrin, but no satisfactory results have yet been achieved.

Therefore, an object of the present invention is to provide cyclodextrin derivatives having extremely high solubility in water.

DISCLOSURE OF INVENTION

The present inventor conducted intensive studies in order to achieve the above-stated object and found that it could be attained by providing a cyclodextrin derivative having at least one group selected from among a sulfonic acid group, a sulfonic acid salt group, an ammonium salt group, a phosphoric acid group, a carboxyl group, a carboxylic acid salt group and a hydroxyl group.

The present invention is described below in greater detail.

In accordance with the present invention, the water solubility of cyclodextrin (hereunder abbreviated as CD) is improved significantly by positively introducing a sulfonic acid group (—$SO_3H$), a sulfonic acid salt group (—$SO_3M$), an ammonium salt group, preferably $NH_4{}^+X^-$ group (X is a halogen atom), a phosphoric acid group (—$PO(OH)_2$), a carboxyl group (—COOH), a carboxylic acid salt group (—COOM) or a hydroxyl group into the molecule of CD. Specific examples of the CD derivative of the present invention these obtained include: those having a sulfonic acid group such as monosulfonic acid-$\beta$-CD, heptasulfonic acid-$\beta$-CD, disulfonic acid $\beta$-CD, tetradecasulfonic acid $\beta$-CD and heneicosasulfonic acid $\beta$-CD; those having an ammonium salt group such as monotrimethylammonium (chloride) $\beta$-CD, ditrimethylammonium (chloride) $\beta$-CD and heptatrimethylammonium (chloride) $\beta$-CD; those having a phosphoric acid group such as monophosphoric acid $\beta$-CD, diphosphoric acid $\beta$-CD and heptaphosphoric acid $\beta$-CD; and those having a carboxyl group such as monocarboxylic acid $\beta$-CD, dicarboxylic acid $\beta$-CD, heptacarboxylic acid $\beta$-CD and biscarboxylic acid $\beta$-CD.

Useful sulfonic acid salt groups and carboxylic acid salt groups include alkali metal (e.g. K or Na) salts of a sulfonic acid group or a carboxyl group and CD derivatives having those groups may be used as the CD derivatives of the present invention.

The CD to be used in the present invention may be of any type such as $\alpha$-CD, $\beta$-CD or $\gamma$-CD.

Shown below are exemplary reaction schemes for the synthesis of CD derivatives having at least one sulfonic acid group in accordance with the present invention, with the illustrated CD derivatives being monosulfonic acid $\beta$-CD, disulfonic acid $\beta$-CD, heptasulfonic acid $\beta$-CD, tetradecasulfonic acid $\beta$-CD and heneicosasulfonic acid $\beta$-CD.

(1) Synthesis of monosulfonic acid $\beta$-CD

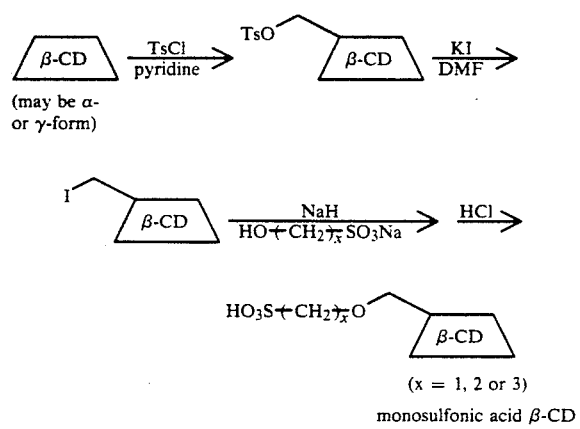

(2) Synthesis of heptasulfonic acid $\beta$-CD (3) Synthesis of disulfonic acid $\beta$-CD -continued

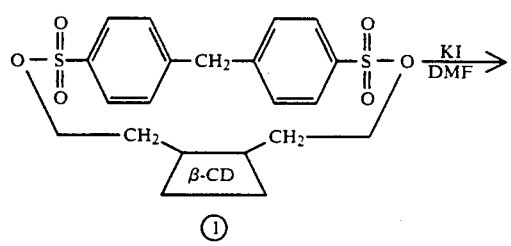
①

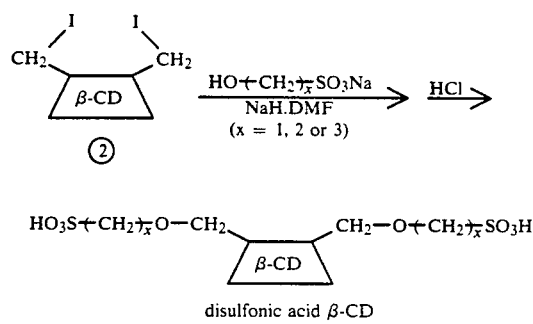

disulfonic acid β-CD (4) Synthesis of tetradecasulfonic acid β-CD

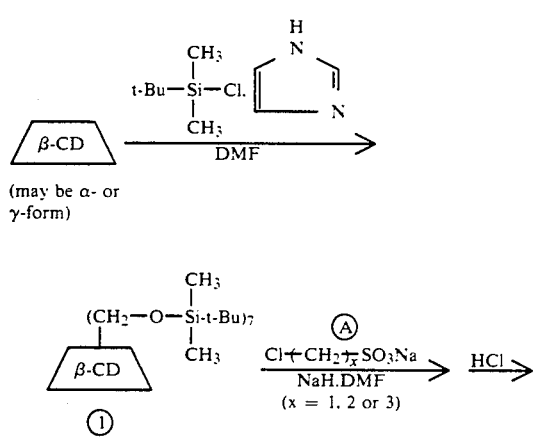

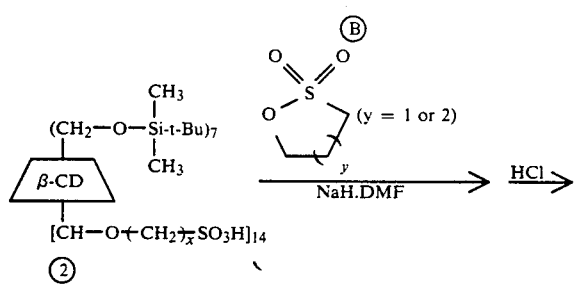
②

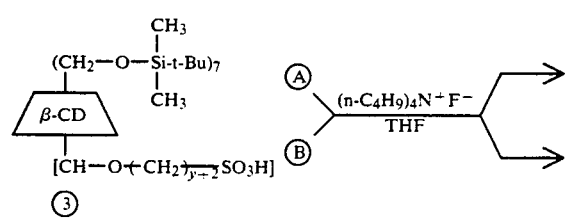
③

-continued

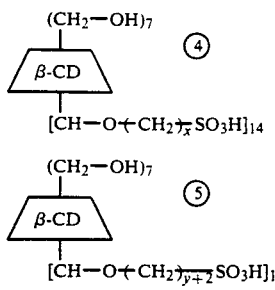
(4)

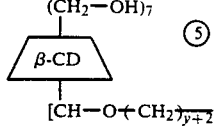
(5)

(5) Synthesis of heneicosasulfonic acid β-CD

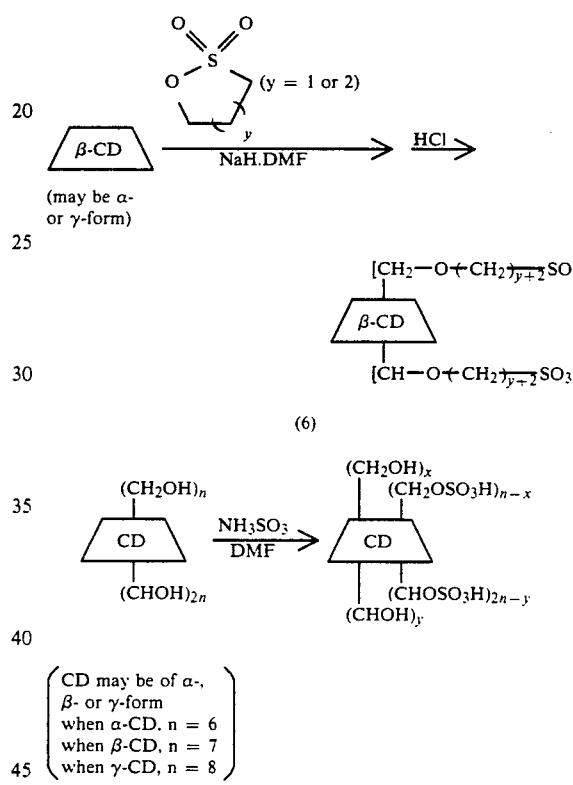

(6)

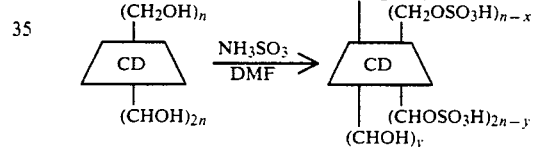

$$\begin{pmatrix} \text{CD may be of } \alpha\text{-,} \\ \beta\text{- or } \gamma\text{-form} \\ \text{when } \alpha\text{-CD, n} = 6 \\ \text{when } \beta\text{-CD, n} = 7 \\ \text{when } \gamma\text{-CD, n} = 8 \end{pmatrix}$$

The above-listed monosulfonic acid β-CD, disulfonic acid β-CD, heptasulfonic acid β-CD, tetradecasulfonic acid β-CD and heneicosasulfonic acid β-CD can specifically be synthesized by the following schemes.

(1) Synthesis scheme for monosulfonic acid β-CD

β-CD is dissolved in pyridine at room temperature and, to the resulting solution, paratoluenesulfonyl chloride dissolved in pyridine is added dropwise at 20° C. After the end of the dropwise addition, the mixture is stirred overnight at room temperature and, after the end of the reaction, pyridine is distilled off under vacuum at 40° C. or below, with the residue being added to a large volume of acetone for effecting reprecipitation. The precipitate is collected and purified by repeated recrystallization from water (yield: 25%).

The thus obtained β-CD monotosylate is reacted with KI in DMF overnight at 70°-80° C. and, after the end of the reaction, DMF is distilled off under vacuum, with the residue being reprecipitated from a large volume of acetone. The precipitate is purified by recrystallization from n-butanol/ethanol/water (yield: 60%).

Subsequently, sodium hydroxymethanesulfonate (x=1) is reacted with NaH in DMF and, to the reaction mixture, the β-CD monoiodide obtained in the previous step is added and the mixture is stirred for 12 h at 70°–80° C.; after the end of the reaction, DMF is distilled off under vacuum and the residue is reprecipitated from a large volume of acetone. The precipitate is collected and treated with dilute hydrochloric acid to obtain β-CD moosulfonic acid (yield: 40%).

(2) Synthesis scheme for heptasulfonic acid β-CD

β-CD is dissolved in DMF and methanesulfonyl bromide is added, followed by stirring at 60°–70° C. for 24 h. After the end of the reaction, DMF is distilled off under vacuum and the residue is reprecipitated from a large volume of methanol. Then, the precipitate is neutralized with a base and, thereafter, the mixture is added to ice cooled water and filtered, with the precipitate being repeatedly washed with ice cooled water and vacuum dried to obtain β-CD heptabromide (yield: 80%).

Subsequently, sodium hydroxymethanesulfonate (x=1) is reacted with NaH in DMF and, to the reaction mixture, the β-CD heptabromide obtained in the previous step is added and the mixture is stirred for 24 h at 70°–80° C.; after the end of the stirring, DMF is distilled off under vacuum and the residue is reprecipitated from a large volume of acetone. The precipitate is purified by separation on column and subsequently treated with hydrochloric acid to obtain β-CD heptasufonic acid (yield: 20%).

(3) Synthesis scheme for disulfonic acid β-CD

β-CD is dissolved in pyridine at room temperature and, to the resulting solution, diphenylmethane p,p'-disulfonium chloride dissolved in pyridine is added dropwise at 5° C. After the end of the dropwise addition, the mixture is stirred overnight at 20° C. or below and, after the end of the reaction, pyridine is distilled off under vacuum at 40° C. or below, with the residue being precipitated from a large volume of acetone. The precipitate is collected and purified by repeated recrystallization from water (yield: 15%) . . . ①.

The thus obtained compound ① is reacted with KI in DMF overnight at 70°–80° C. and, after the end of the reaction, DMF is distilled off under vacuum, with the residue being reprecipitated from a large volume of acetone. The precipitate is purified by recrystallization from n-butanol/ethanol/water (yield: 55%) . . . ②.

Subsequently, sodium hydroxymethanesulfonate (x=1) and NaH are reacted in DMF and, to the reaction mixture, previously obtained compound ② is added at room temperature, followed by stirring at 70°–80° C. for 24 h; after the end of the reaction, DMF is distilled off under vacuum and the residue is reprecipitated from a large volume of acetone. The precipitate is collected and treated with dilute hydrochloric acid to obtain disulfonic acid β-CD (yield: 30%).

(4) Synthesis scheme for tetradecasulfonic acid β-CD

β-CD and imidazole are dissolved in DMF at room temperature and, to the resulting solution, t-butyldimethylsilyl chloride dissolved in DMF is added dropwise. After the end of the dropwise addition, the mixture is stirred for 6 h at room temperature and, after the end of the reaction, DMF is distilled off under vacuum, with the residue being separated by chromatography on silica gel column (developing solvent: chloroform-ethanol).

The thus obtained compound is further recrystallized from ethanol to purify compound ①.

Method Ⓐ: Subsequently, compound ① is dissolved in DMF and reacted with NaH at room temperature in a nitrogen atmosphere. Then, sodium chloromethanesulfonate (x=1) dissolved in DMF is slowly added dropwise and, after the end of the dropwise addition, reaction is performed at 60°–70° C. for 12 h. After the end of the reaction, DMF is distilled off under vacuum and the residue is reprecipitated from a large volume of ethyl ether, with the precipitate being collected and treated with dilute hydrochloric acid to obtain compound ② (yield: 45%).

Method Ⓑ: Subsequently, compound ① is dissolved in DMF and reacted with NaH at room temperature in a nitrogen atmosphere. Then, 1,3-propanesultone (y=1) dissolved in DMF is added dropwise slowly and, after the end of the dropwise addition, reaction is performed at room temperature for 24 h. After the end of the reaction, DMF is distilled off under vacuum and the residue is reprecipitated from a large volume of ethyl ether, with the precipitate being collected and treated with dilute hydrochloric acid to obtain compound ③ (yield: 70%).

Compound ② (or ③) is dissolved in THF and, to the resulting solution, tetrabutylammonium fluoride dissolved in THF is added dropwise. After the end of the dropwise addition, reaction is performed under reflux for 5 h, followed by distilling off THF under vacuum. The residue is dissolved in a small volume of DMF and purified by repeated reprecipitation from acetone to obtain compound ④ (or ⑤) (yield of ④=75%; yield of ⑤=70%).

(5) Synthesis scheme for heneicosasulfonic acid β-CD

β-CD is dissolved in DMF and reacted with NaII in a nitrogen atmosphere at 5° C. or below. Then, 1,3-propanesultone (y=1) dissolved in DMF is slowly added dropwise and, after the end of the dropwise addition, reaction is performed at room temperature for 60 h. After the end of the reaction, DMF is distilled off under vacuum and the residue is reprecipitated from a large volume of dichloromethane. The precipitate is collected and treated with dilute hydrochloric acid to obtain heneicosasulfonic acid β-CD (yield: 25%).

(6) Synthesis scheme for sulfonic acid β-CD

β-CD is dissolved in dehydrated DMF and sulfamic acid is added to the solution at room temperature. Thereafter, reaction is performed at 60°–70° C. for 3 h in a nitrogen stream. After the end of the reaction, the product is left to cool to room temperature and DMF is distilled off under vacuum, with the residue being reprecipitated from a large volume of acetone and the precipitate being filtered. The precipitate is washed thoroughly with acetone and dried to obtain the end compound (yield: ca. 70%).

Each of the end compounds is identified by suitable methods such as NMR spectroscopy, mass spectroscopy and elemental analysis.

The following are exemplary reaction schemes for synthesizing CD derivatives having a sulfonic acid salt group.

SYNTHETIC REACTION SCHEMES (1) Monosulfonate β-CD, heptasulfonate β-CD, disulfonate β-CD, tetradecasulfonate β-CD and heneicosasulfonate β-CD can be synthesized by the same reactions as for the above-described monosulfonic acid β-CD, heptasulfonic acid β-CD, disulfonic acid β-CD, tetradecasulfonic acid β-CD and heneicosasulfonic acid β-CD, respectively, except that HCl treatment is not performed in the last step.

(2) Synthesis of sulfonate β-CD corresponding to the above-described sulfonic β-CD (6)

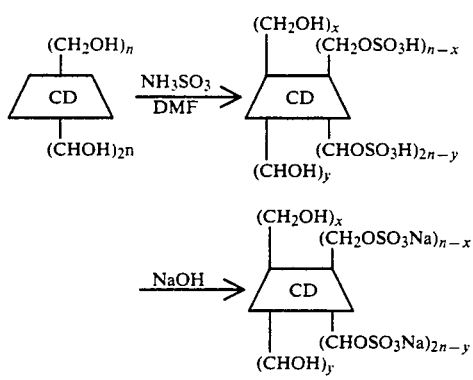

The reactions for synthesis described above can specifically be carried out in accordance with the schemes outlined below.

(1) Reaction for the synthesis of CD derivatives having the sulfonic acid groups described above By quenching the reactions under (1)–(5) without performing the treatment with dilute hydrochloric acid in the final stage, monosulfonate β-CD, heptasulfonate β-CD, disulfonate β-CD, tetradecasulfonate β-CD and heneicosasulfonate β-CD can be obtained.

(2) Synthesis of sulfonate β-CD

The final product of the above-described CD derivative (6) having a sulfonic acid group is dissolved in an aqueous solution of 2N NaOH and stirred at room temperature for 1 h. After the end of the reaction, water is distilled off under vacuum and the residue is reprecipitated with ethyl ether (yield: ca. 90%).

In the next place, exemplary reaction schemes for the synthesis of CD derivatives having at least one ammonium salt group are described below.

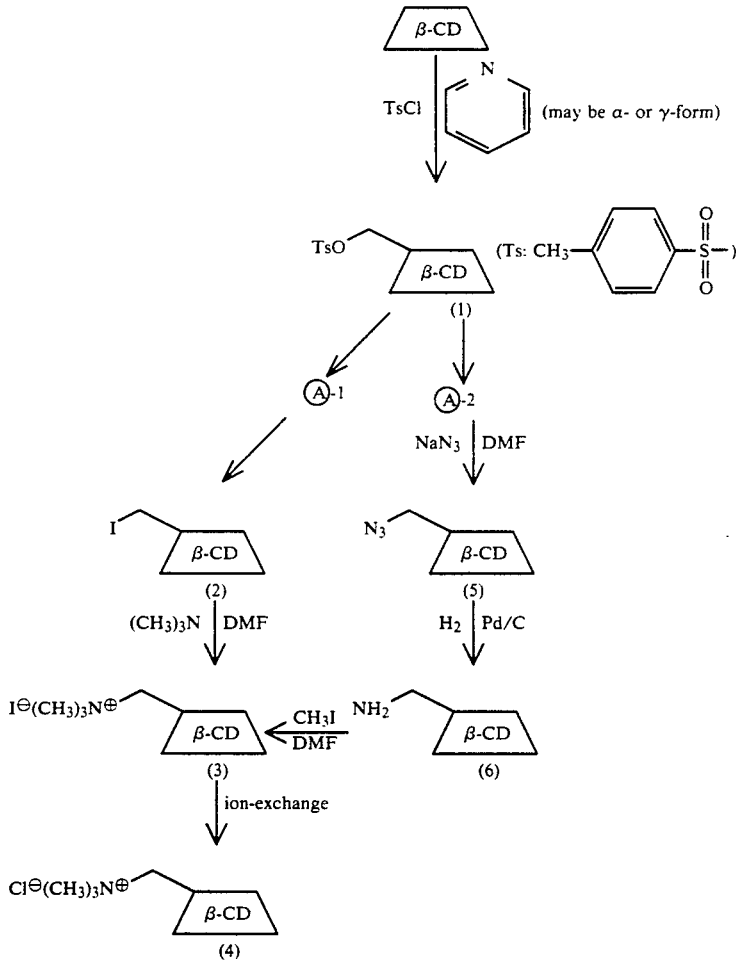

(A) Monotrimethylammonium (chloride) β-CD (4)

(B) Ditrimethylammonium (chloride) β-CD

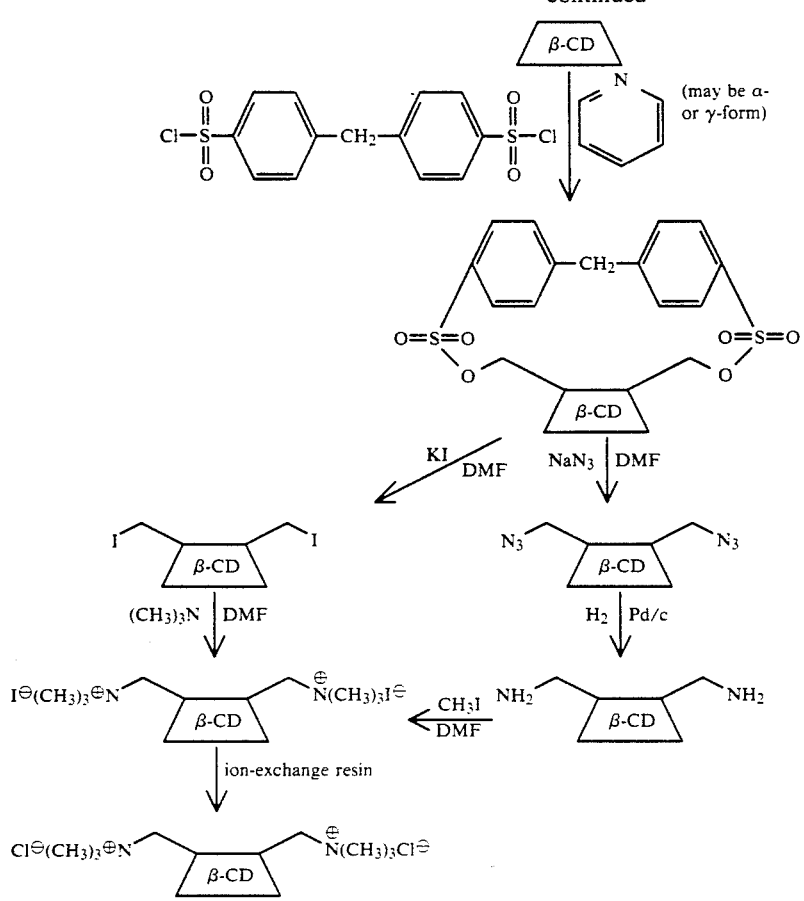

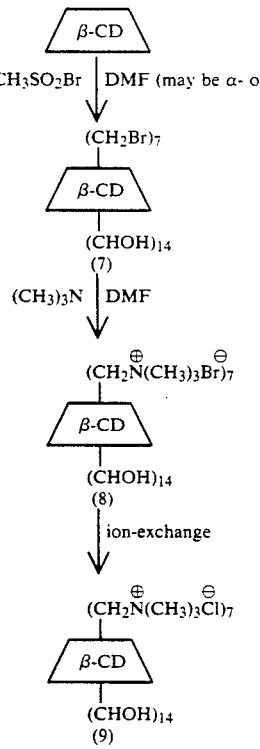

Ⓒ Heptatrimethylammonium (chloride) β-CD (9)

The reactions for synthesis described above can specifically be carried out in accordance with the schemes outlined below.

Ⓐ Synthesis of monotrimethylammonium (chloride) β-CD

Ⓐ-1: β-CD is dissolved in pyridine at room temperature and, to the resulting solution, paratoluenesulfonyl chloride dissolved in pyridine is added dropwise at 20° C. After the end of the dropwise addition, the mixture is stirred overnight at room temperature and, after the end of the reaction, pyridine is distilled off under vacuum at 40° C. or below, with the residue being added to a large volume of acetone for effecting reprecipitation. The precipitate is collected and purified by repeated recrystallization from water to obtain β-CD monotosylate (1) (yield: 25%).

The thus obtained β-CD monotosylate is reacted with KI in DMF overnight at 70°-80° C. and, after the end of the reaction, DMF is distilled off under vacuum, with the residue being reprecipitated from a large volume of acetone. The precipitate is purified by recrystallization from n-butanol/ethanol/water to obtain compound (2) (yield: 60%).

Further, compound (2) is dissolved in DMF and cooled to 0° C. Then, trimethylamine is added at 0° C. and reaction is performed at 0°-5° C. for 12 h. After the end of the reaction, DMF and triethylamine are distilled off under vacuum and the residue is reprecipitated from a large volume of acetone. The precipitate is collected and recrystallized from a water/ethanol system to obtain compound (3) (yield: 60%).

Compound (3) is dissolved in water and passed through an anion-exchange resin of Cl⁻ form, whereby monotrimethylammonium (chloride) β-CD (4) is obtained almost quantitatively (yield: 90%).

Ⓐ-2: Sodium azide is dissolved in water and previously obtained compound (1) is added to the resulting system. Subsequently, the mixture is heated at 80°-90° C. to perform reaction for 3 h. After being left to cool to room temperature, the reaction mixture is filtered and water is concentrated under vacuum. The residue is reprecipitated from a large volume of methanol. The precipitate is collected and recrystallized from water to obtain compound (5) (yield: 70%).

Further, compound (5) is dissolved in DMF solvent and hydrogenated by addition of a small amount of 10% palladium on carbon (pressure: 8-10 atm; temperature: 30°-40° C.). Twenty-four hours later, the reaction mixture is left to cool to room temperature and filtered. The solvent is distilled off under vacuum and the residue is reprecipitated from a large volume of acetone. The precipitate is collected and recrystallized from water/ethanol to obtain compound (6) (yield: 60%).

Subsequently, compound (6) and $K_2CO_3$ are dissolved in DMF and the solution is cooled to 0°-5° C. To the resulting system, cooled methyl iodide is added and, thereafter, the mixture is subjected to reaction at 30°-40° C. for 12 h. After the end of the reaction, the reaction mixture is left to cool to room temperature and DMF and methyl iodide are distilled off under vacuum, with the residue being reprecipitated from a large volume of acetone. The precipitate is collected and recrystallized from a water/ethanol system to obtain compound (3) (yield: 25%).

The subsequent procedure is the same as in Ⓐ-1, whereupon monotrimethylammonium (chloride) β-CD (4) is obtained.

Ⓑ Ditrimethylammonium (chloride) β-CD can be synthesized in essentially the same manner as in Ⓐ.

Ⓒ Synthesis of heptatrimethylammonium (chloride) β-CD

β-CD is dissolved in DMF at room temperature and methanesulfonyl bromide is added to the solution, which is thereafter stirred at 60°-70° C. for 24 h. After the end of the reaction, DMF is distilled off under vacuum and the residue is reprecipitated from a large volume of methanol. Further, the precipitate is neutralized with a base and added to ice cooled water; after filtration, the precipitate is washed with ice cooled water and vacuum dried to obtain compound (7) (yield: 80%).

Compound (7) is dissolved in DMF and cooled to 0° C. Subsequently, trimethylamine is added at 0° C. and reaction is performed at 0°-5° C. for 12 h. After the end of the reaction, DMF and trimethylamine are distilled off under vacuum and the residue is reprecipitated from a large volume of diethyl ether. The precipitate is collected and recrystallized from a water/ethanol system to obtain compound (8) (yield: 20%).

Subsequently, compound (8) is dissolved in water and passed through an anion-exchange resin of Cl⁻ form, whereby heptatrimethylammonium (chloride) β-CD (9) is obtained almost quantitatively (yield: 90%).

The end compounds are identified by suitable methods such as NMR spectroscopy, mass spectroscopy and elemental analysis.

Exemplary reaction schemes for the synthesis of CD derivatives having at least one phosphoric acid group are described below.

Ⓐ Monophosphoric acid β-CD:

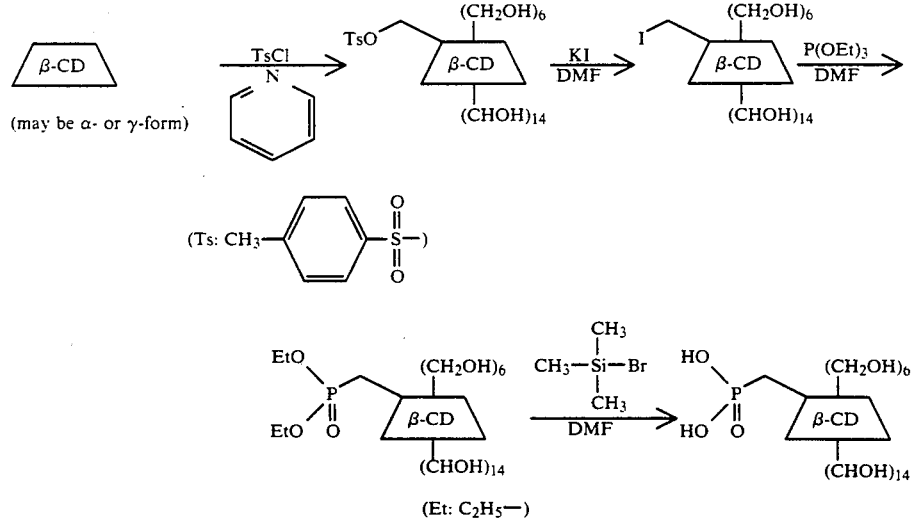

Ⓑ Diphosphoric acid β-CD (4):

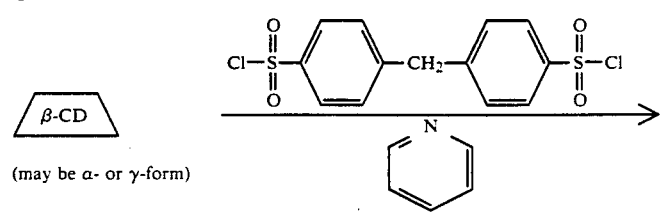

-continued

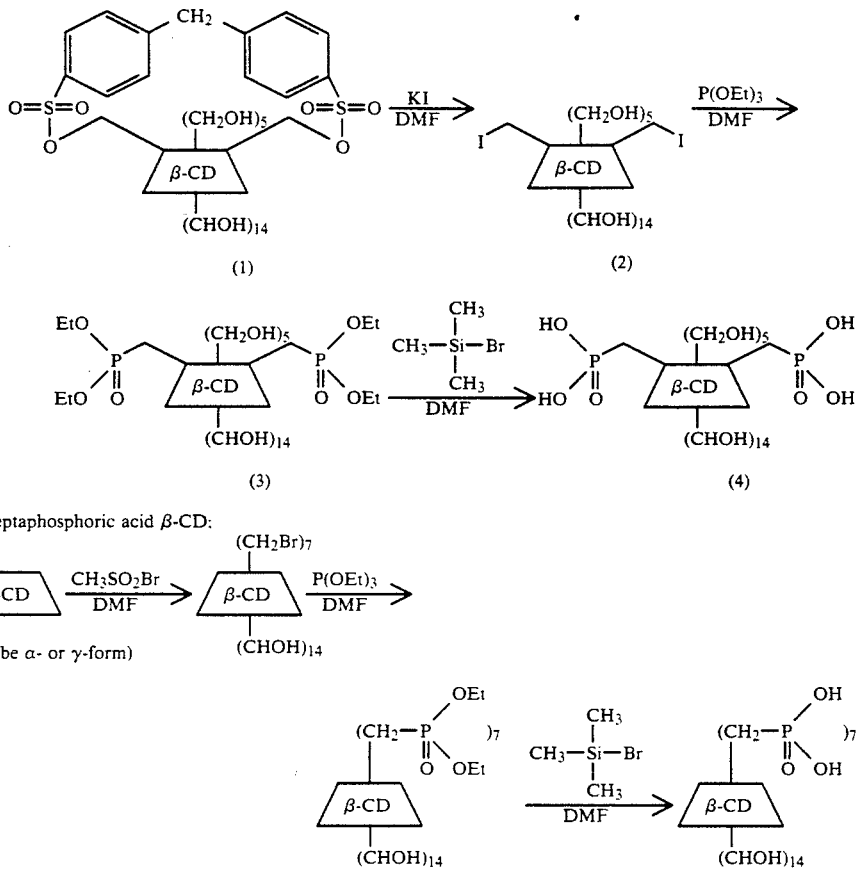

Ⓒ Heptaphosphoric acid β-CD:

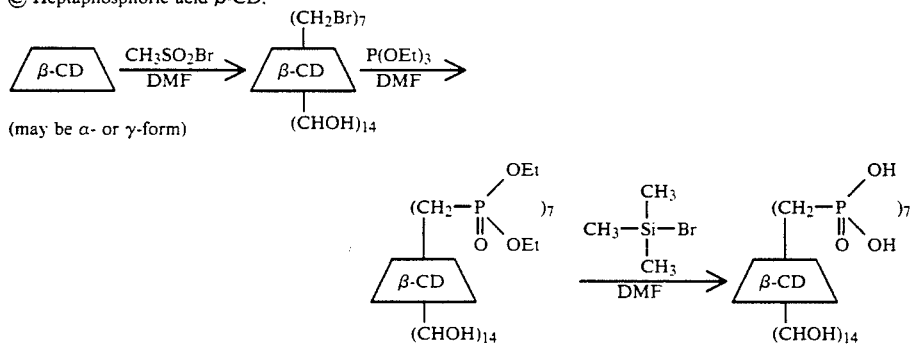

The reactions for synthesis described above can specifically be carried out in accordance with the following schemes.

Ⓐ Synthesis of monophosphoric β-CD

β-CD is dissolved in pyridine at room temperature and, to the resulting solution, paratoluenesulfonyl chloride dissolved in pyridine is added dropwise at 20° C. After the end of the dropwise addition, the mixture is stirred overnight at room temperature and, after the end of the reaction, pyridine is distilled off at 40° C. or below, with the residue being added to a large volume of acetone for effecting reprecipitation. The precipitate is collected and purified by repeated recrystallization from water to obtain β-CD monotosylate (1) (yield: 25%).

The thus obtained β-CD is reacted with KI in DMF overnight at 70°-80° C. and, after the end of the reaction, DMF is distilled off under vacuum, with the residue being reprecipitated from a large volume of acetone. The precipitate is purified by recrystallization from n-butanol/ethanol/water to obtain compound (2) (yield: 60%).

Subsequently, the thus obtained β-CD monoiodide is dissolved in DMF and reacted with triethyl phosphite at 90°-100° C. for 24 h. After the end of the reaction, triethyl phosphite and DMF are distilled off under vacuum and the residue is reprecipitated from a large volume of acetone, with the precipitate being thoroughly washed with water and the resulting crystal being vacuum dried.

The crystal is then dissolved in a small volume of DMF and, to the resulting solution, bromotrimethylsilane (BTMS) is added and reaction is performed at 30°-40° C. for 12 h. After the end of the reaction, BTMS and DMF are distilled off under vacuum and the residue is reprecipitated from a large volume of diethyl ether, with the precipitate being collected and purified by recrystallization from a chloroform/ethanol system to obtain monophosphoric acid β-CD (mono-6-dihydroxyphosphonyl-6-deoxy β-CD) (yield: 35%).

(B) Synthesis of diphosphoric acid β-CD

β-CD is dissolved in pyridine at room temperature and, to the resulting solution, diphenylmethane p,p'-disulfonyl chloride dissolved in pyridine is added dropwise at 5° C. After the end of the dropwise addition, the mixture is stirred overnight at 20° C. or below and, after the end of the reaction, pyridine is distilled off at 40° C. or below and the residue is reprecipitated from a large volume of acetone. The precipitate is collected and purified by repeated recrystallization from water to obtain compound (1) (yield: 15%).

The thus obtained compound (1) is reacted with KI in DMF overnight at 70°-80° C. and, after the end of the reaction, DMF is distilled off under vacuum and the residue is reprecipitated from a large volume of acetone. The precipitate is collected and purified by recrystallization from n-butanol/ethanol/water to obtain compound (2) (yield: 55%).

Subsequently, the thus obtained compound (2) is dissolved in DMF and reacted with triethyl phosphite at 90°-100° C. for 24 h. After the end of the reaction, triethyl phosphite and DMF are distilled off under vacuum and the residue is reprecipitated from a large volume of acetone, with the precipitate being washed thoroughly with water and the resulting crystal being vacuum dried to obtain compound (3).

Further, the thus obtained compound (3) is dissolved in a small volume of DMF and, after addition of BTMS, subjected to reaction at 30°–40° C. for 12 h. After the end of the reaction, BTMS and DMF are distilled off under vacuum and the residue is reprecipitated from a large volume of diethyl ether, with the precipitate being collected and purified by recrystallization from a chloroform/ethanol system to obtain diphosphoric acid β-CD (4) (yield: 25%).

(C) Synthesis of heptaphosphoric acid β-CD

β-CD is dissolved in DMF at room temperature and, after addition of methanesulfonyl bromide, the mixture is stirred at 60°–70° C. for 24 h. After the end of the reaction, DMF is distilled off under vacuum and the residue is reprecipitated from a large volume of methanol. Subsequently, the precipitate is neutralized with a base, added to ice cooled water and filtered, followed by washing the precipitate with ice cooled water and vacuum drying to obtain β-CD heptabromide (yield: 80%).

Subsequently, β-CD heptabromide is dissolved in DMF and reacted with triethyl phosphite at 90°–100° C. for 60 h. After the end of the reaction, triethyl phosphite and DMF are distilled off under vacuum and the residue is reprecipitated from large volume of acetone, with the precipitate being collected and thoroughly washed with water and the resulting crystal being vacuum dried.

Further, the crystal is dissolved in a small volume of DMF and, after addition of bromotrimethylsilane (BTMS), subjected to reaction at 30°–40° C. for 30 h. After the end of the reaction, BTMS and DMF are distilled off under vacuum and the residue is reprecipitated from a large volume of THF, with the precipitate being collected and purified by recrystallization from a chloroform/ethanol system to obtain heptaphosphoric acid β-CD (yield: 10%).

The end compounds can be identified by suitable methods such as NMR spectroscopy, mass spectroscopy and elemental analysis.

Exemplary reaction schemes for the synthesis of CD derivatives having at least one carboxyl group or carboxylic acid salt group are described below.

(A) Monocarboxylic acid β-CD;

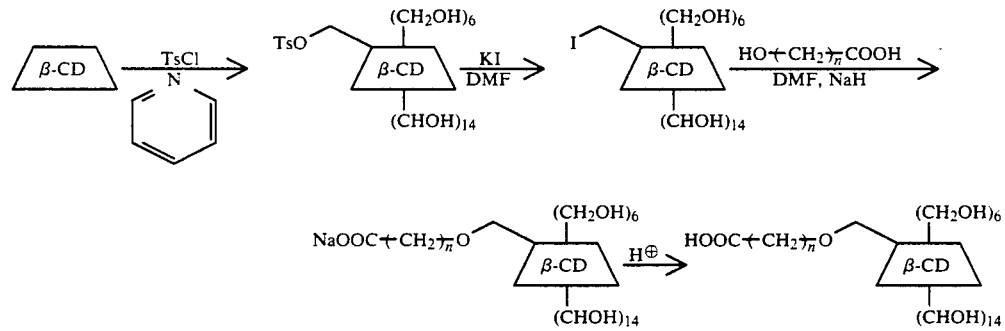

(B) Dicarboxylic acid β-CD:

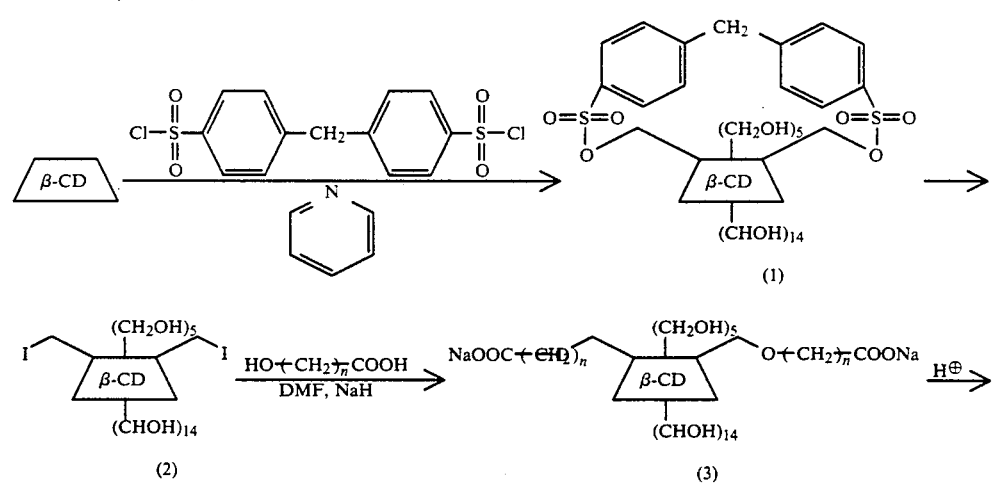

(C) Heptacarboxylic acid β-CD;

-continued
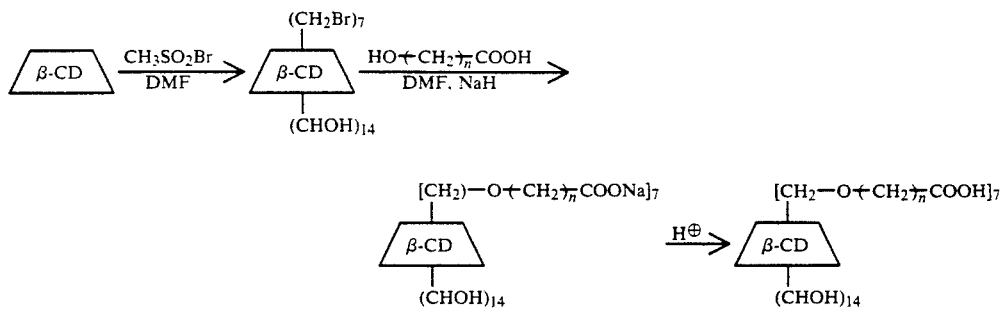
where n = 1-3 and CD may be in either α- or γ-form.
(D)
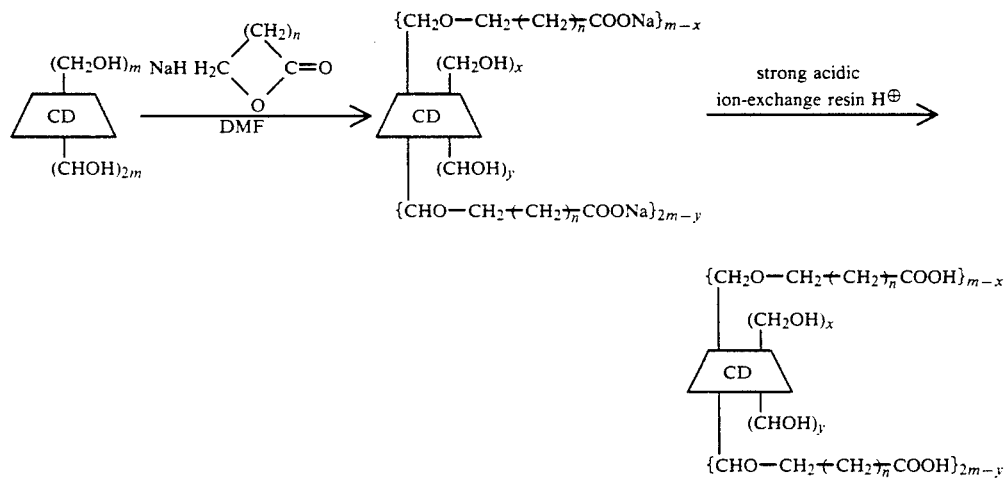
$$\begin{pmatrix} \alpha\text{-CD} \longrightarrow m = 6 \\ \beta\text{-CD} \longrightarrow m = 7 \\ \gamma\text{-CD} \longrightarrow m = 8 \end{pmatrix}$$
*where n 1-4
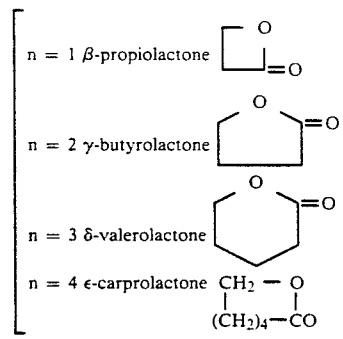
n = 1 β-propiolactone
n = 2 γ-butyrolactone
n = 3 δ-valerolactone
n = 4 ε-carprolactone
(E)
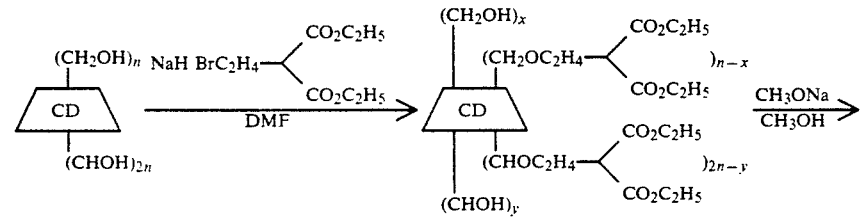

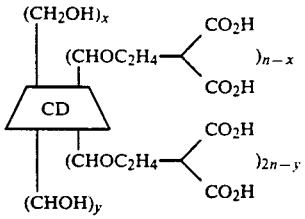

(F) 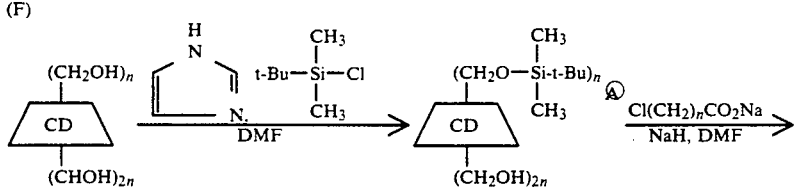

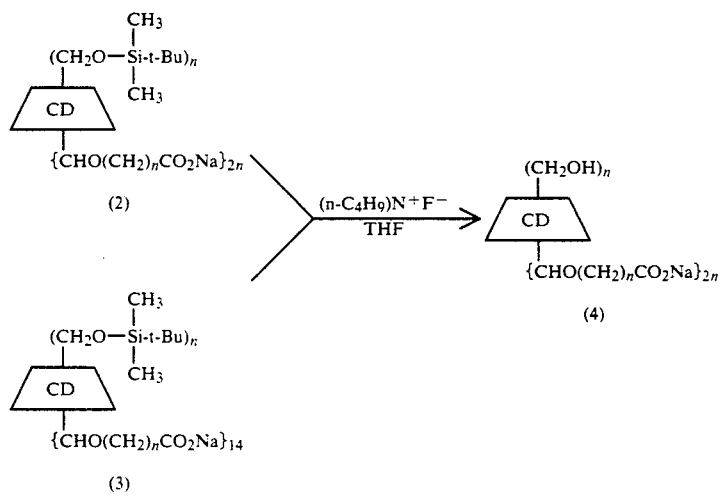

In (E) and (F), n is 6-8.

The reactions for synthesis described above can specifically be carried out in accordance with the following schemes.

(A) Synthesis of monocarboxylic acid β-CD

β-CD is dissolved in dehydrated pyridine at room temperature and, to the resulting system, p-toluenesulfonyl chloride dissolved in pyridine is added dropwise at 20° C. or below. After the end of the dropwise addition, the mixture is further stirred overnight at room temperature. After the end of the reaction, pyridine is distilled off under vacuum at 40° C. or below and the residue is reprecipitated from a large volume of acetone, with the precipitate being collected and recrystallized three times from water (yield: ca. 25%).

The thus obtained β-CD monotosylate is dissolved in DMF and reacted with KI overnight at a temperature of 70°-80° C. After the end of the reaction, DMF is distilled off under vacuum and the residue is reprecipitated from a large volume of acetone, with the precipitate being collected and recrystallized from an n-butanol/ethanol/water system (yield: ca. 60%).

Subsequently, glycolic acid (n=1) and NaH are reacted in DMF at room temperature in a nitrogen stream and, one hour later, the system is heated to a temperature of 30°-40° C., whereupon β-CD monoiodide dissolved in DMF is added dropwise and, after the end of the dropwise addition, the mixture is subjected to reaction overnight at 90°-100° C. After the end of the reaction, DMF is distilled off under vacuum and the residue is reprecipitated from a large volume of acetone, with the precipitate being dissolved in hot methanol and filtered, followed by another reprecipitation from a large volume of acetone. The precipitate is collected, dissolved in water and treated with a strong acidic ion-exchange resin to obtain the end compound (yield: ca. 35%).

(B) Synthesis of dicarboxylic acid β-CD

β-CD is dissolved in pyridine at room temperature and, to the resulting solution, diphenylmethane p,p′-disulfonyl chloride dissolved in pyridine is added dropwise at 5° C. After the end of the dropwise addition, the mixture is stirred overnight at 20° C. or below. After the end of the reaction, pyridine is distilled off under vacuum at 40° C. or below and the residue is reprecipitated from a large volume of acetone. The precipitate is collected and purified by repeated recrystallization from water to obtain compound (1) (yield: ca. 15%).

The thus obtained compound (1) is reacted with KI in DMF overnight at a temperature of 70°-80° C. and, after the end of the reaction, DMF is distilled off under vacuum and the residue is reprecipitated from a large volume of acetone. The precipitate is collected and purified by recrystallization from an n-butanol/e- thanol/water system to obtain compound (2) (yield: ca. 55%).

Subsequently, glycolic acid and NaII are reacted in DMF at room temperature in a nitrogen stream and, one hour later, the system is heated to 30°-40° C., whereupon the compound (2) dissolved in DMF is added dropwise and, after the end of the dropwise addition, the mixture is subjected to reaction overnight at a temperature of 90°-100°. After the end of the reaction, DMF is distilled off under vacuum and the residue is reprecipitated from a large volume of acetone, with the precipitate being dissolved in hot ethanol, filtered and subjected to another precipitation from a large volume of acetone to obtain compound (3). The precipitate is collected, dissolved in water and treated with a strong acidic ion-exchange resin to obtain compound (4) (yield: ca. 20%).

(C) Synthesis of heptacarboxylic acid $\beta$-CD $\beta$-CD is dissolved in DMF at room temperature and, after addition of methanesulfonyl bromide, the mixture is stirred at 60°-70° C. for 24 h. After the end of the reaction, DMF is distilled off under vacuum and the residue is reprecipitated from a large volume of methanol. After neutralization, the precipitate is added to ice cooled water, filtered, washed thoroughly with ice cooled water and dried to obtain $\beta$-CD heptabromide (yield: ca. 80%).

Subsequently, glycolic acid (n=1) and NaII are reacted in DMF at room temperature in a nitrogen stream and, one hour later, the system is heated to a temperature of 30°-40° C., whereupon $\beta$-CD heptabromide dissolved in DMF is added dropwise and, after the end of the dropwise addition, the mixture is subjected to reaction overnight at a temperature of 90°-100° C. After the end of the reaction, DMF is distilled off under vacuum and the residue is reprecipitated from a large volume of diethyl ether, with the precipitate being dissolved in hot ethanol, filtered and subjected to another reprecipitation from a large volume of diethyl ether. The precipitate is collected, dissolved in water and treated with a strong acidic ion-exchange resin to obtain the end compound (yield: ca. 10%). (D) $\beta$-CD is dissolved in dehydrated DMF and reacted with NaII in a nitrogen stream. After stirring for 1 h at room temperature, the system is heated to 60°-70° C. With the temperature held at that level, a solution of $\beta$-propiolactone (n=1) in DMF is slowly added dropwise. After the end of the dropwise addition, the system is further heated to 100° C. and subjected to reaction for 12 h at that temperature. After the end of the reaction, DMF is distilled off under vacuum and the residue is reprecipitated from a large volume of acetone. The precipitate is dissolved in hot methanol, filtered and subjected to another reprecipitation from a large volume of acetone. The precipitate is collected, dissolved in water and treated with a strong acidic ion-exchange resin to obtain the end compound (yield: 75%).

(E) Synthesis of biscarboxylic acid $\beta$-CD $\beta$-CD is dissolved in dehydrated DMF and reacted with NaII in a nitrogen stream. After stirring for 1 h at room temperature, the system is heated to 60°-70° C. With the temperature held at that level, a solution of diethyl 2-bromoethylmalonate in DMF is slowly added dropwise. After the end of the dropwise addition, the system is further heated to 100° C. and subjected to reaction for 12 h that temperature. After the end of the reaction, DMF is distilled off under vacuum and the residue is reprecipitated from a large volume of acetone. The precipitate is separated by filtration, dried and thereafter dissolved in methanol, with a solution of sodium alcolate in methanol being added dropwise to the system, followed by reaction at room temperature for 24 h. After the end of the reaction, the precipitate is separated by filtration and a strong acidic ion-exchange resin is added to the filtrate, followed by stirring for 1 h. After concentrating methanol, the residue is reprecipitated from a large volume of acetone. The precipitate is filtered and dried to obtain the end compound (yield: ca. 60%).

We now describe the synthesis of CD derivatives having carboxylic acid salt groups.

As for the synthesis of mono-, di- and heptacarboxylic acid salt $\beta$-CD corresponding to (A)-(D) described above, as well as carboxylic acid salt $\beta$-CD (D), the end compounds can be obtained by repeating the reaction schemes for (A)-(D) except that the treatment with a strong acidic ion-exchange resin in the last step is omitted.

Synthesis of (F) tetradecacarboxylic acid salt $\beta$-CD can be performed in the following manner.

(F) Synthesis of tetradecacarboxylic acid salt $\beta$-CD $\beta$-CD and imidazole are dissolved in DMF at room temperature and, to the resulting solution, t-butyldimethylsilyl chloride dissolved in DMF is added dropwise. After the end of the dropwise addition, the mixture is stirred at room temperature for 6 h and, after the end of the reaction, DMF is distilled off under vacuum and the residue is separated and purified by chromatography on silica gel column. The obtained compound is recrystallized from ethanol to obtain compound (1) which is subsequently purified (yield: ca. 70%).

Method (A): Compound (1) is dissolved in DMF and reacted with NaII in a nitrogen atmosphere at room temperature. Then, sodium chloroacetate (n=1) dissolved in DMF is slowly added dropwise and, after the end of the dropwise addition, the mixture is subjected to reaction at 60°-70° C. for 12 h. After the end of the reaction, DMF is distilled off under vacuum and the residue is reprecipitated from a large volume of ethyl ether. The precipitate is collected and dried, with compound (2) being separated and purified by chromatography on silica gel column (yield: ca. 35%).

Method (B): Compound (1) is dissolved in DMF and reacted with NaII in a nitrogen atmosphere at room temperature. Then, $\beta$-propiolactone (x=1) dissolved in DMF is slowly added dropwise and, after the end of the dropwise addition, the mixture is subjected to reaction at 90°-100° C. for 24 h. After the end of the reaction, DMF is distilled off under vacuum and the residue is reprecipitated from a large volume of ethyl ether. The precipitate is collected and dried, with compound (3) being separated and purified by chromatography on silica gel column (yield: ca. 40%).

Each of compounds (2) and (3) is dissolved in THF and, to the resulting solution, tetrabutylammonium fluoride dissolved in THF is added dropwise at room temperature. After the end of the dropwise addition, reaction is performed under reflux for 5 h and, thereafter, the precipitate is separated by filtration and repeatedly washed with acetone to obtain compound (4).

Compound (4) by method (A) (yield: ca. 60%).
Compound (4) by method (B) (yield: ca. 65%).

The end compounds are identified by suitable methods such as NMR spectroscopy, mass spectroscopy and elemental analysis.

Other CD derivatives can be synthesized by similar procedures based on the above-described methods.
In the next place, we describe exemplary reaction schemes for the synthesis of CD derivatives having at least one hydroxyl group.
(A) Mono-(bishydroxy) β-CD
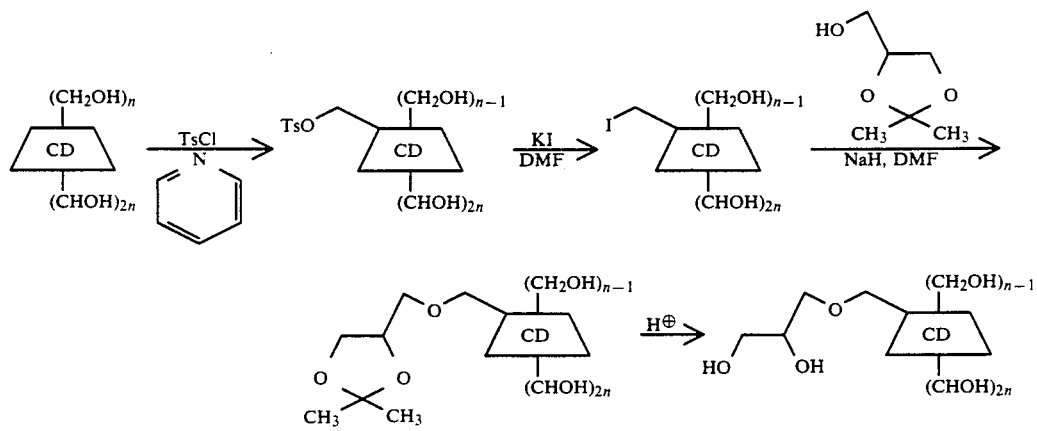
(B) Di-(bishydroxy) β-CD
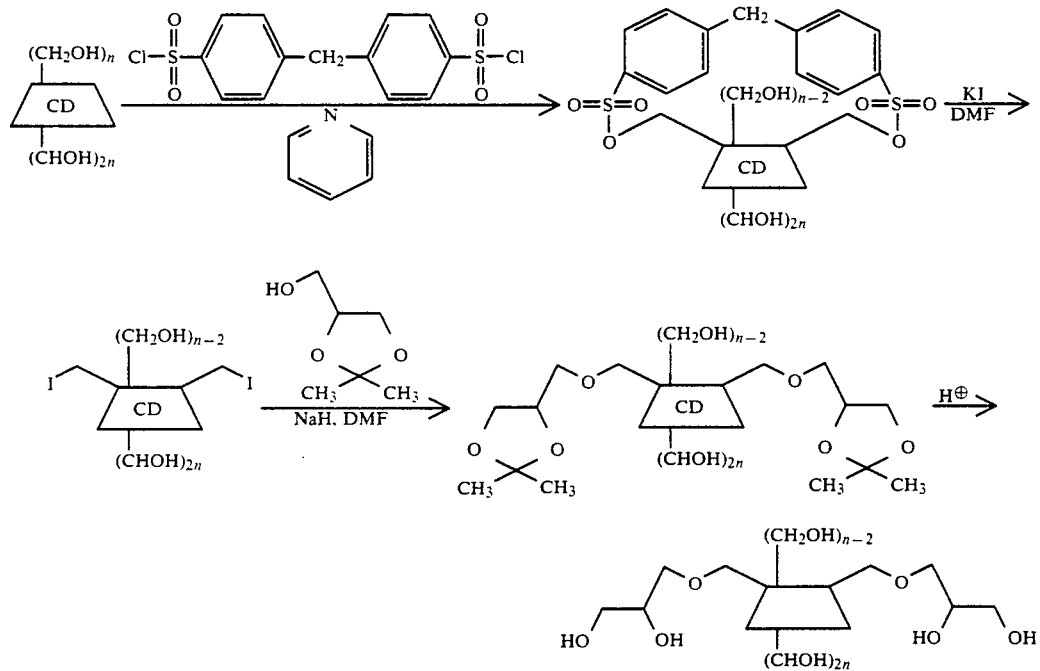
(C) Hepta-(bishydroxy) β-CD
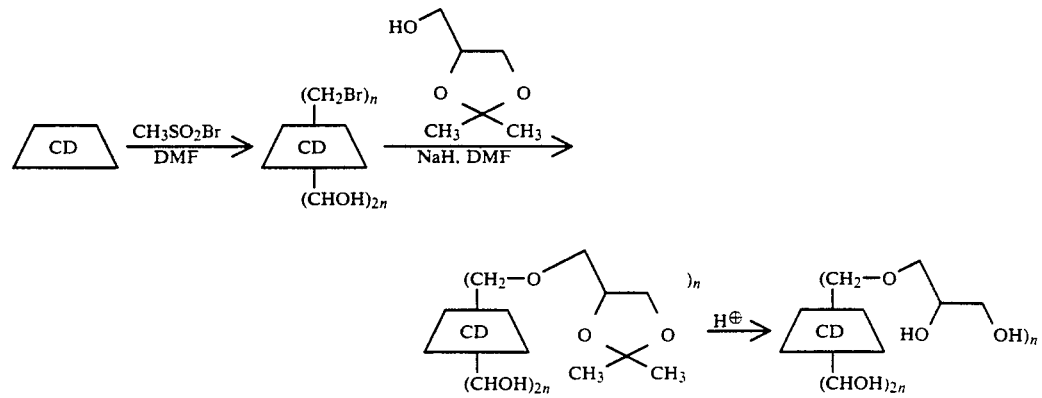
(D) Mono-(trishydroxy) β-CD

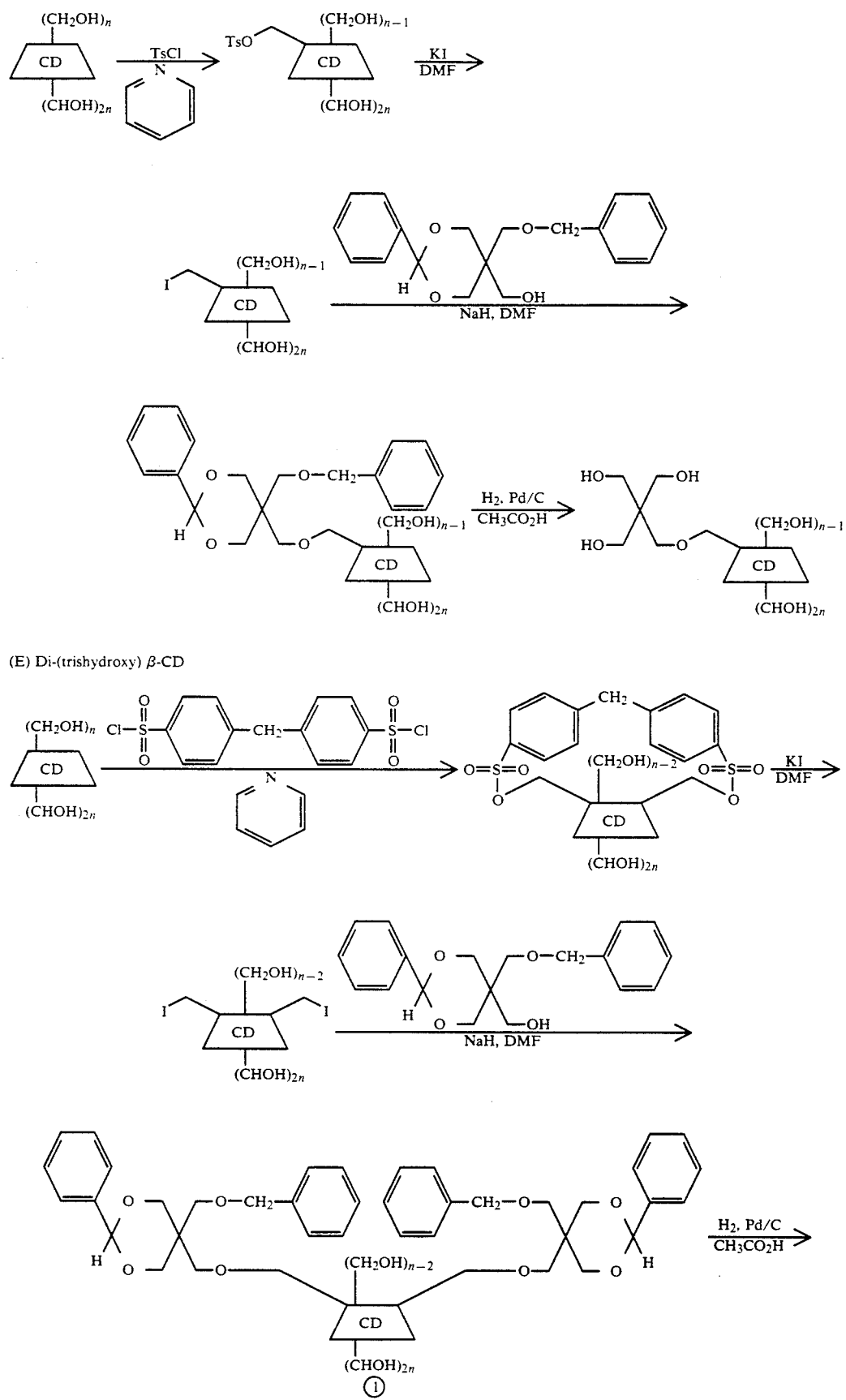
(E) Di-(trishydroxy) β-CD

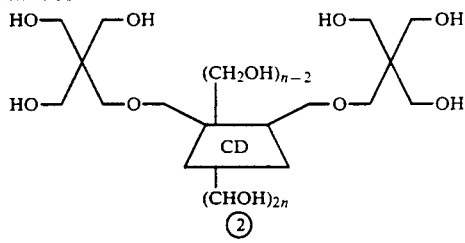

(F) Hepta-(trishydroxy) β-CD

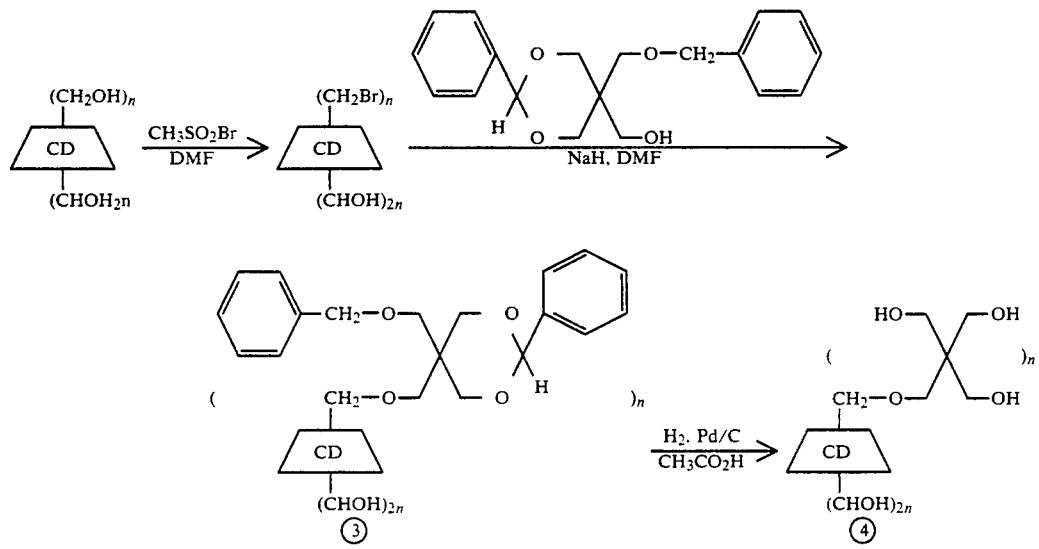

In (A)–(F), n represents 6–8

The reactions for synthesis described above can specifically be carried out in accordance with the following schemes.

(A) Synthesis of mono-(bishydroxy)β-CD

β-CD is dissolved in dehydrated pyridine at room temperature and, to the resulting system, p-toluenesulfonyl chloride dissolved in pyridine is added dropwise at 20° C. or below. After the end of the dropwise addition, the mixture is further stirred overnight at room temperature. After the end of the reaction, pyridine is distilled off under vacuum at 40° C. or below and the residue is reprecipitated from a large volume of acetone, with the precipitate being collected and recrystallized three times from water (yield: ca. 25%).

The thus obtained β-CD monotosylate is dissolved in DMF and reacted with KI overnight at 70°–80° C. After the end of the reaction, DMF is distilled off under vacuum and the residue is reprecipitated from a large volume of acetone, with the precipitate being collected and recrystallized from an n-butanol/ethanol/water system (yield: ca. 60%).

Subsequently, 2,2-dimethyl-1,3-dioxolane-4-methanol and NaH are reacted in DMF at room temperature in a nitrogen atmosphere and, one hour later, the system is heated to 30°–40° C., whereupon β-CD monoiodide dissolved in DMF is added dropwise and, after the end of the dropwise addition, reaction is performed overnight at 90°–100° C. After the end of the reaction, DMF is distilled off under vacuum and the residue is reprecipitated from a large volume of acetone, with the precipitate being dissolved in hot methanol, filtered and subjected to another reprecipitation from a large volume of acetone. The precipitate is collected and recrystallized with methanol (yield: ca. 30%).

Further, the precipitate is dissolved in acetic acid and, to the resulting solution, a hydrochloric acid/acetic acid (1/1) solution is added dropwise at room temperature and the mixture is stirred for ca. 1 h, followed by concentrating the solvent under vacuum and reprecipitating the residue from a large volume of acetone. The precipitate is collected, washed thoroughly with acetone and methanol, and vacuum dried to obtain the end compound (yield: ca. 80%).

(B) Synthesis of di-(bishydroxy)β-CD

β-CD is dissolved in pyridine at room temperature and, to the resulting solution, diphenylmethane p,p′-disulfonyl chloride dissolved in pyridine is added dropwise at 5° C. After the end of the dropwise addition, the mixture is stirred overnight at 20° C. or below. After the end of the reaction, pyridine is distilled off under vacuum at 40° C. or below and the residue is reprecipitated from a large volume of acetone. The precipitate is collected and purified by repeated recrystallization from water (yield: ca. 15%).

The thus obtained compound is reacted with KI in DMF overnight at 70°–80° C. and, after the end of the reaction, DMF is distilled off under vacuum, with the residue being reprecipitated from a large volume of acetone. The precipitate is collected and purified by recrystallization from an n-butanol/ethanol/water system (yield: ca. 55%).

Subsequently, 2,2-dimethyl-1,3-dioxolane-4-methanol and NaH are reacted in DMF at room temperature in a nitrogen atmosphere and, one hour later, the system is heated to 30°-40° C., whereupon the precipitate dissolved in DMF is added dropwise and, after the end of the dropwise addition, the mixture is subjected to reaction overnight at 90°-100° C. After the end of the reaction, DMF is distilled off under vacuum and the residue is reprecipitated from a large volume of acetone, with the precipitate being dissolved in hot ethanol, filtered and subjected to another reprecipitation from a large volume of acetone. The precipitate is collected and recrystallized with ethanol (yield: ca. 20%).

Further, the precipitate is dissolved in acetic acid and, to the resulting solution, a hydrochloric acid/acetic acid (1/1) solution is added dropwise at room temperature and the mixture is stirred for ca. 1 h, followed by concentrating the solvent under vacuum and reprecipitating the residue from a large volume of acetone. The precipitate is collected, washed thoroughly with acetone and methanol, and vacuum dried to obtain the end compound (yield: ca. 70%).

(C) Synthesis of hepta(bishydroxy)$\beta$-CD $\beta$-CD is dissolved in DMF at room temperature and, after the addition of methanesulfonyl bromide, the mixture is stirred at 60°-70° C. for 24 h. After the end of the reaction, DMF is distilled off under vacuum and the residue is reprecipitated from a large volume of methanol. After neutralization, the precipitate is added to ice cooled water, filtered, washed with ice cooled water thoroughly and dried to obtain $\beta$-CD heptabromide (yield: ca. 80%).

Subsequently, 2,2-dimethyl-1,3-dioxolane-4-methanol and NaH are reacted in DMF at room temperature in a nitrogen atmosphere and, one hour later, the system is heated to 30°-40° C., whereupon $\beta$-CD heptabromide dissolved in DMF is added dropwise and, after the end of the dropwise addition, the mixture is subjected to reaction overnight at 90°-100° C. After the end of the reaction, DMF is distilled off under vacuum and the residue is reprecipitated from a large volume of diethyl ether, with the precipitate being dissolved in hot ethanol, filtered and subjected to another reprecipitation from a large volume of diethyl ether. The precipitate is collected and recrystallized from ethanol (yield: ca. 10%).

Further, the precipitate is dissolved in acetic acid and, to the resulting solution, a hydrochloric acid/acetic acid (1/1) solution is added dropwise at room temperature and the mixture is stirred for ca. 2 h, followed by concentrating the solvent under vacuum and reprecipitating the residue from a large volume of acetone. The precipitate is collected, washed thoroughly with acetone and methanol, and vacuum dried to obtain the end compound (yield: ca. 70%).

(D) Synthesis of mono-(trishydroxy)$\beta$-CD

For the synthesis of up to $\beta$-CD monotosylate and $\beta$-CD monoiodide, see "Synthesis of mono-(bishydroxy)$\beta$-CD" under (A).

Subsequently, 2-phenyl-5-benzyloxymethyl-5-hydroxymethyl-1,3-dioxane and NaH are reacted in DMF at room temperature in a nitrogen stream and, one hour later, the system is heated to 30°-40° C., whereupon $\beta$-CD monoiodide dissolved in DMF is added dropwise and, after the end of the dropwise addition, the mixture is subjected to reaction overnight at 90°-100° C. After the end of the reaction, DMF is distilled off under vacuum and the residue is reprecipitated from a large volume of acetone, with the precipitate being dissolved in hot ethanol and subjected to another reprecipitation from a large volume of acetone. The precipitate is collected and recrystallized with ethanol (yield: ca. 15%).

Further, the precipitate is dissolved in acetic acid and hydrogenated by addition of 5% Pd/C (under pressure of 5 kg/cm² at room temperature). After 24-h reaction, Pd/C is separated by filtration and acetic acid is distilled off under vacuum, with the residue being reprecipitated from a large volume of acetone. The precipitate is washed thoroughly with acetone and methanol and vacuum dried to obtain the end compound (yield: ca. 80%).

(E) Synthesis of di-(trishydroxy)$\beta$-CD

For the synthesis of $\beta$-CD iodide, see "Synthesis of di-(bis-hydroxy)$\beta$-CD" under (B). The synthesis of compound ① and end compound ② is performed in the same manner as described in "Synthesis of mono-(trishydroxy)$\beta$-CD under (D).

①: (yield: ca. 5%) ②: (yield: ca. 80%)

(F) Synthesis of hepta-(trishydroxy)$\beta$-CD

For the synthesis of $\beta$-CD heptabromide, see "Synthesis of hepta-(bishydroxy)$\beta$-CD" under (C). The synthesis of compound ③ and end compound ④ is performed in the same manner as described in "Synthesis-of di-(bishydroxy)$\beta$-CD" under (B), except that diethyl ether is used as the solvent for reprecipitation, which is followed by vacuum drying.

③: (yield: ca. 5%) ④: (yield: ca. 60%)

The end compounds are identified by suitable methods such as NMR spectroscopy, mass spectroscopy and elemental analysis.

Other CD derivatives can be synthesized by similar procedures based on the above-described methods.

The water solubility of the CD derivatives obtained in the manner described above was checked and the results are shown below.

TABLE 1

| Water Solubility (g/100 ml H₂O) | | |
| --- | --- | --- |
| Material Name | Solubility (25° C., g/100 ml H₂O) | |
| $\beta$-CD | 1.85 | From "Japanese Food Processing Data" |
| Dimethyl $\beta$-CD | 57 | |
| Hydroxypropyl $\beta$-CD | 115 | |
| Monosulfonic acid $\beta$-CD | >400 | x = 1 |
| Heptasulfonic acid $\beta$-CD | >600 | x = 1 |
| Disulfonic acid $\beta$-CD | >500 | x = 1 |
| Tetradecasulfonic acid $\beta$-CD | >750 | x = 1 |
| Heneicosasulfonic acid $\beta$-CD | >900 | x = 1 |
| Sulfonic acid $\beta$-CD according to Synthesis Scheme (6) | >400 | |
| Sodium monosulfonate $\beta$-CD | >500 | |
| Sodium disulfonate $\beta$-CD | >620 | |
| Sodium heptasulfonate $\beta$-CD | >750 | — |
| Sodium tetradecasulfonate $\beta$-CD | >820 | |
| Sodium heneicosasulfonate $\beta$-CD | >950 | |
| Sodium sulfonate $\beta$-CD (2) | >600 | |
| Monotrimethylammonium (chloride) $\beta$-CD | >200 | |
| Ditrimethylammonium (chloride) $\beta$-CD | >250 | — |
| Heptatrimethylammonium (chloride) $\beta$-CD | >400 | |
| Monophosphoric acid $\beta$-CD | >250 | |
| Diphosphoric acid $\beta$-CD | >350 | — |
| Heptaphosphoric acid $\beta$-CD | >500 | |
| Monocarboxylic acid $\beta$-CD | >150 | |
| Dicarboxylic acid $\beta$-CD | >200 | |
| Heptacarboxylic acid $\beta$-CD | >300 | when n = 1 |
| Carboxylic acid $\beta$-CD (D) | >250 | |
| Biscarboxylic acid $\beta$-CD | >350 | |
| Sodium monocarboxylate $\beta$-CD | >200 | |
| Sodium dicarboxylate $\beta$-CD | >250 | |
| Sodium heptacarboxylate $\beta$-CD | >450 | — |

TABLE 1-continued

| Material Name | Water Solubility (g/100 ml H$_2$O) Solubility (25° C., g/100 ml H$_2$O) |
| --- | --- |
| Sodium tetradecacarboxylate β-CD | >700 |
| Sodium biscarboxylate β-CD | >420 |
| Sodium carboxylate β-CD (D) | >350 |
| Mono-(bishydroxy) β-CD | >120 |
| Di-(bishydroxy) β-CD | >180 |
| Hepta-(bishydroxy) β-CD | >280 |
| Mono-(trishydroxy) β-CD | >200 |
| Di-(trishydroxy) β-CD | >250 |
| Hepta-(trishydroxy) β-CD | >380 |

As described in detail on the foregoing pages, a sulfonic acid group, a sulfonic acid salt group, an ammonium salt group, a phosphoric acid group, a carboxyl group, a carboxylic acid salt group or a hydroxyl group is introduced positively into CD in accordance with the present invention and this achieves a substantial improvement in the solubility of CD in water, thereby providing CD inclusion compounds of high water solubility.

INDUSTRIAL APPLICABILITY

The CD derivatives of the present invention which have high water solubility may be useful as chemicals (e.g. pharmaceuticals and agrichemicals), aromatics, fragrances, cosmetics, detergents, paints, dyes, food additives in foodstuffs, etc.

I claim:

1. A cyclodextrin derivative comprising cyclodextrin substituted by at least one bishydroxyl group or trishydroxyl group.

2. A cyclodextrin derivative, comprising cyclodextrin having primary and secondary hydroxyl group positions, the cyclodextrin being substituted by at least one member of the group consisting of a sulfonic acid group, a sulfonic acid salt group, a phosphoric acid group, an ammonium salt group, a carboxyl group, and a carboxylic acid salt group at the primary hydroxyl group position.

3. A cyclodextrin derivative according to claim 2 wherein the carboxyl group or carboxylic acid salt group is a biscarboxyl group or a biscarboxylic acid salt group.

4. A cyclodextrin derivative as defined in claim 2, wherein the cyclodextrin is substituted by 1, 2, 7, 14, or 21 sulfonic acid groups.

5. A cyclodextrin derivative as defined in claim 2, wherein the cyclodextrin is substituted by 1, 2, 7, 14, or 21 sulfonic acid salt groups.

6. A cyclodextrin derivative as defined in claim 2, wherein the cyclodextrin is substituted by 1, 2, or 7 phosphoric acid groups.

7. A cyclodextrin derivative as defined in claim 2, wherein the cyclodextrin is substituted by 1, 2, 7, or 14 carboxyl acid groups.

8. A cyclodextrin derivative as defined in claim 2, wherein the cyclodextrin is substituted by 1, 2, 7, or 14 carboxyl acid salt groups.

9. A cyclodextrin derivative as defined in claim 2, wherein the cyclodextrin is substituted by 1, 2, or 7 ammonium salt groups.

10. A cyclodextrin derivative, comprising cyclodextrin having primary and secondary hydroxyl group positions, the cyclodextrin being substituted by at least one member of the group consisting of a sulfonic acid group, a sulfonic acid salt group, a carboxyl group, and a carboxylic acid salt group at the secondary hydroxyl group position.

11. A cyclodextrin derivative as defined in claim 10, wherein the cyclodextrin is substituted by 1, 2, 7, 14, or 21 sulfonic acid groups.

12. A cyclodextrin derivative as defined in claim 10, wherein the cyclodextrin is substituted by 1, 2, 7, 14, or 21 sulfonic acid salt groups.

13. A cyclodextrin derivative as defined in claim 10, wherein the cyclodextrin is substituted by 1, 2, 7, or 14 carboxyl acid groups.

14. A cyclodextrin derivative as defined in claim 10, wherein the cyclodextrin is substituted by 1, 2, 7, or 14 carboxyl acid salt groups.

15. A cyclodextrin derivative, comprising cyclodextrin having primary and secondary hydroxyl group positions, the cyclodextrin being substituted by sulfonic acid groups or sulfonic acid salt groups at all the primary and secondary hydroxyl group positions.

16. A cyclodextrin derivative as defined in claim 15, wherein the cyclodextrin is substituted by 1, 2, 7, 14, or 21 sulfonic acid groups.

17. A cyclodextrin derivative as defined in claim 15, wherein the cyclodextrin is substituted by 1, 2, 7, 14, or 21 sulfonic acid salt groups.

* * * * *